T. E. CLARK.
MOLD FOR SEWERS.
2 SHEETS—SHEET 1.
Reissued Apr. 19, 1910. APPLICATION FILED MAR. 14, 1910. 13,106.
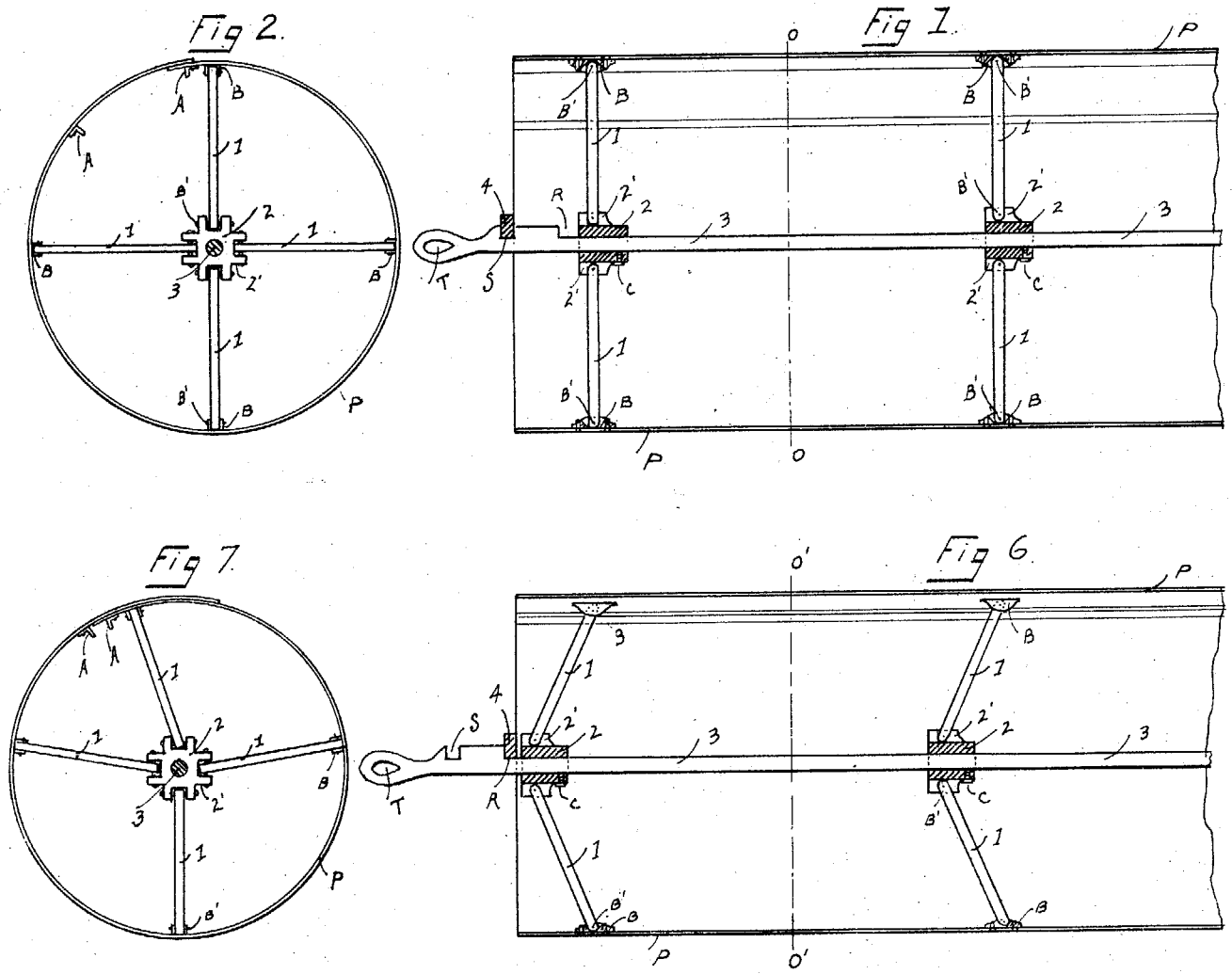
WITNESSES:
J. F. Spencer
E. A. Stickney
INVENTOR.
Theodore Ellsworth Clark
ANDREW B. GRAHAM CO. PHOTO-LITHOGRAPHERS, WASHINGTON, D. C.

T. E. CLARK.
MOLD FOR SEWERS.
Reissued Apr. 19, 1910. APPLICATION FILED MAR. 14, 1910. 2 SHEETS—SHEET 2.
13,106.
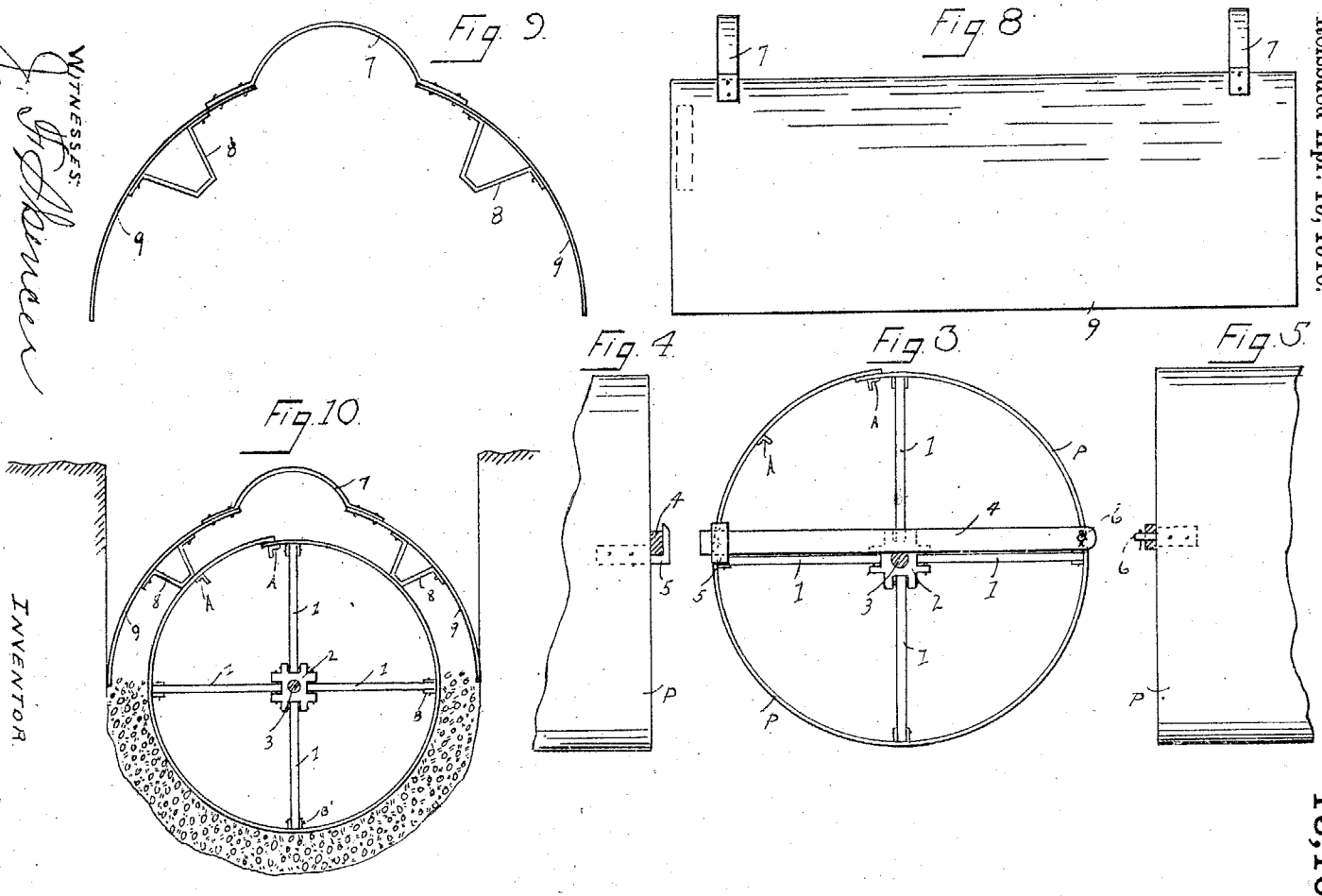
WITNESSES:
J. F. Spencer
E. A. Stickney
INVENTOR.
Theodore Ellsworth Clark
ANDREW B. GRAHAM CO., PHOTO-LITHOGRAPHERS, WASHINGTON, D. C.

UNITED STATES PATENT OFFICE.

THEODORE ELLSWORTH CLARK, OF SACRAMENTO, CALIFORNIA.

MOLD FOR SEWERS.

13,106. Specification of Reissued Letters Patent. Reissued Apr. 19, 1910.

Original No. 948,539, dated February 8, 1910, Serial No. 465,660. Application for reissue filed March 14, 1910. Serial No. 549,574.

*To all whom it may concern:*

Be it known that I, THEODORE ELLSWORTH CLARK, a citizen of the United States, residing at Sacramento, in the county of Sacramento and State of California, have invented new and useful Improvements in Molds for Sewers, of which the following is a specification.

My invention relates to improvements in molds for sewers, conduits, water-pipes, culverts and other tubular structures of the kind which are constructed of cement, concrete, brick, or other suitable materials, and the object of my invention is to provide a contractible sewer-mold that may easily be set up and conveniently removed from the sewer-pipe or conduit after the said pipe has been constructed about it. I attain this and other objects by the mechanism described in this specification and illustrated in the accompanying drawings which form part thereof and in which similar letters or figures refer to similar parts throughout.

Figure 1 is a longitudinal sectional view in part of the sewer-mold forming the basis of my invention. Fig. 2 is a transverse sectional view of the same on the dotted line *o—o*. Fig. 3 is an end view of the same and Figs. 4 and 5 are side views of Fig. 3. Fig. 6 is a longitudinal sectional view in part of the sewer-mold in its contracted form. Fig. 7 is a transverse sectional view of the same at the point indicated by the dotted line *o′—o′*. Fig. 8 is a side view of the upper or semi-circular form or mold which is used in connection with the contractable mold in forming the upper half of sewer-pipes, conduits etc. Fig. 9 is a transverse sectional view of Fig. 8. Fig. 10 is a transverse sectional view of a trench showing a sewer-pipe or conduit partly constructed about the sewer-mold and showing the semi-circular mold Fig. 8 in position leaving a space between it and the sewer-mold ready to be filled with concrete or other mixture.

Having thus described the several views, I will now explain more in detail the various parts. In Figs. 1 and 2, P is a sheet-steel or iron circular tube or pipe with its longitudinal seam unriveted or unfastened together, one edge overlapping the other as shown in the upper part of Fig. 2. This sewer-mold may be any desired length consistent with the facility with which it may be handled; for pipes of ordinary diameter, I employ molds twenty to thirty feet long.

In the several views, 3 is a rod extending the full length of the mold, one end being constructed as shown with recesses R and S and an eye T. Upon the rod 3 are hubs 2 having forked projections 2′ to receive the arms 1 which are rotatably secured to lugs B at one end and to the forked projections at the other by rivets or bolts B′. B are lugs which are riveted or bolted to the inner surface of the sheet-iron mold and which receive one end of the arms 1. The hubs 2 are securely fastened to the rod 3 by set-screws C or other suitable means. There may be any number of arms 1 with corresponding lugs B and projections 2′ as may be desired, reference being had to the diameter of the mold. I show only four to each hub for the sake of illustration. This combination of hubs 2, arms 1, lugs B and rod 3 form toggle-joints which, when the rod 3 is drawn out, causes the sheet-iron mold P to be contracted and assume a smaller diameter as shown in Figs. 6 and 7. There may be any number of these toggle-joints, reference being had to the length of the mold.

In order that the arms 1 may retain their position at right angles to the rod 3 as shown in Fig. 1, a bar 4, Fig. 3, is dropped into the recess S, said bar extending across the mold, one end being rotatably connected to one edge of the mold P by the lug 6 (see Fig. 5) and the other end dropped into the catch 5 (see Fig. 4) secured to the diametrical opposite edge of the mold. By this arrangement, a simple yet effective means is provided for holding the rod 3 in a fixed position so that the toggle-joints may not operate and cause a diminution of the diameter of the sewer-mold when a sewer-pipe is being constructed about it. When it is desired to remove the sewer-mold from the inside of a conduit which has been constructed about it, the rod 3 is partly drawn out by pulling on the eye T and the bar 4 dropped into the recess R. The act of drawing out the bar 3 causes the several toggle-joints to act simultaneously in contracting the diameter of the mold as indicated in Figs. 6 and 7, one edge lapping over the other as indicated in the upper part of Fig. 7. When the sewer-mold has been contracted, it may readily be removed from the sewer-pipe or conduit and placed in position ready for the construction of another portion or section of sewer, the mold, after having been withdrawn, having been enlarged again to its original diameter by forcing back the rod 3 into the position indicated in Fig. 1.

For the purpose of stiffening the edges of the mold where they overlap, bars of angle iron A A or other suitable shape are riveted or fastened to the inner surface of the mold as indicated.

In connection with the inner form or mold Fig. 1, an outer form Figs. 8 and 9 may be used, especially where large pipes are to be constructed, although with pipes of small diameter I discard its use altogether. This form consists of two curved pieces of sheet-steel or iron 9—9 joined together by arched braces 7—7, leaving a space lengthwise between the inner edges through which cement or other building material may be passed. On the inner surface and at one end are placed lugs 8—8 extending inwardly which keep the semi-circular form a specified distance from the inner mold, see Fig. 10. This form is made preferably of short length, say four to six feet, and as fast as the cement or other building material is tamped between it and the sewer-mold, it is moved along, one end resting on the top of the sewer already formed and the other end held in place by the lugs 8 resting on the top of the inner form.

In the construction of these molds, it will be noted that various changes may be made in the details without in any way sacrificing any of the advantages of this invention or departing from the spirit thereof.

In describing and claiming my invention as a sewer-mold I do not desire to limit its use specifically to such, but it is adapted to be used as stated in the preamble to the construction of other tubular bodies such as conduits, water-pipes etc. whether constructed of cement, concrete, brick or other building materials. I may state also that with the sewer-mold described in this invention, it is possible to use reinforcing bars or rings in the construction of sewers, conduits, etc.

Having thus described my invention, what I claim as new and desire by Letters Patent to secure, is—

In a contractible sewer-mold, the combination of a tubular section of any convenient length whose longitudinal seam is unriveted or unfastened together, the edges overlapping one another; a centrally located rod extending the length thereof and having an eye or hook on the end of same by which the rod is drawn out in contracting the diameter of the mold and pushed back in restoring it to its original diameter; recesses on said rod adapted to receive a retaining bar; and a retaining bar extending across the end of the mold, one end being rotatably secured to one edge of the mold by a lug or other suitable means and the opposite end adapted to engage in a catch secured to the diametrical opposite edge of the mold.

THEODORE ELLSWORTH CLARK.

Witnesses:
J. F. Spencer,
Edgar Allen Stickney.